United States Patent
Shirali et al.

(10) Patent No.: US 10,022,017 B2
(45) Date of Patent: Jul. 17, 2018

(54) DIVERTERS AND COOKING CHAMBERS AND COOKING APPARATUS INCLUDING DIVERTERS

(71) Applicant: Henny Penny Corporation, Eaton, OH (US)

(72) Inventors: Manouchehr Shirali, Eaton, OH (US); Trent Abney, Eaton, OH (US)

(73) Assignee: Henny Penny Corporation, Eaton, OH (US)

(*) Notice: Subject to any disclaimer, the term of this patent is extended or adjusted under 35 U.S.C. 154(b) by 593 days.

(21) Appl. No.: 14/399,941

(22) PCT Filed: May 10, 2013

(86) PCT No.: PCT/US2013/040580
§ 371 (c)(1),
(2) Date: Nov. 7, 2014

(87) PCT Pub. No.: WO2013/170172
PCT Pub. Date: Nov. 14, 2013

(65) Prior Publication Data
US 2015/0144008 A1    May 28, 2015

Related U.S. Application Data

(60) Provisional application No. 61/645,512, filed on May 10, 2012.

(51) Int. Cl.
*A47J 37/12* (2006.01)

(52) U.S. Cl.
CPC ....... *A47J 37/1285* (2013.01); *A47J 37/1223* (2013.01); *Y10T 137/2224* (2015.04)

(58) Field of Classification Search
CPC .... B08B 3/04; B08B 3/02; B08B 3/08; B08B 3/006; B08B 3/14
(Continued)

(56) References Cited

U.S. PATENT DOCUMENTS

| 5,809,995 A | 9/1998 | Kobayashi |
| 6,182,561 B1 | 2/2001 | Garner et al. |

(Continued)

FOREIGN PATENT DOCUMENTS

| EP | 0 089 186 A1 | 9/1983 |
| FR | 2588740 A1 | 4/1987 |

OTHER PUBLICATIONS

European Patent Office, Extended European Search Report for Patent Application No. EP 16 181 768.9-1656 dated Nov. 29, 2016 (14 pages).

(Continued)

Primary Examiner — Tu B Hoang
Assistant Examiner — Thomas Ward
(74) Attorney, Agent, or Firm — Wood Herron & Evans LLP

(57) ABSTRACT

A diverter, and a cooking chamber and cooking apparatus including the diverter, is capable of diffusing liquids, semi-solid substances, and the like. The diverter includes a diverter plate and an orifice that projects from a surface of the diverter plate. The orifice has an open sidewall portion. The diverter further includes a recessed portion formed in the diverter plate, extending from the orifice, and a bumper portion that projects from a surface of the recessed portion and is disposed proximate to the orifice. The cooking chamber includes a heating element, a wall, an inlet port formed in the wall, and a cooking chamber fitting disposed adjacent to the inlet port. The cooking apparatus includes a cooking chamber, a filter pan, a filter pump, and an inlet port formed in a wall of the cooking chamber.

16 Claims, 9 Drawing Sheets

(58) Field of Classification Search
USPC ............ 134/10, 111; 239/432, 597; 219/388, 219/400; 121/21 A, 15
See application file for complete search history.

(56) References Cited

U.S. PATENT DOCUMENTS

| | | | |
|---|---|---|---|
| 6,351,859 B1 * | 3/2002 | Maiuccoro | A61H 33/027 239/428.5 |
| 6,643,859 B1 | 11/2003 | Brennan | |
| 2010/0212691 A1 * | 8/2010 | Hutson | A47J 37/1223 134/10 |

OTHER PUBLICATIONS

European Patent Office, Extended European Search Report for Patent Application No. EP 13 786 949.1, dated May 11, 2016.
United States Patent and Trademark Office, International Search Report, Written Opinion, and Search History for International Application No. PCT/US2013/040580 (counterpart to above-captioned patent application), dated Sep. 19, 2013.

* cited by examiner

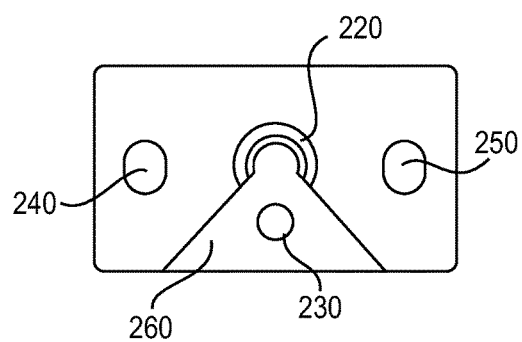
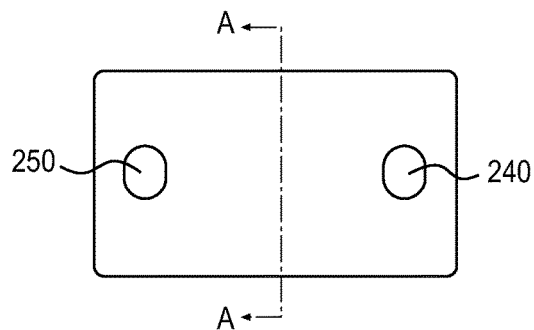
FIG. 2  FIG. 3
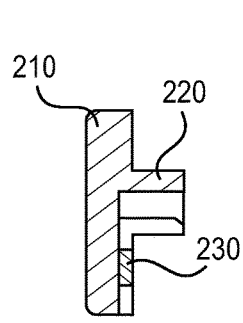
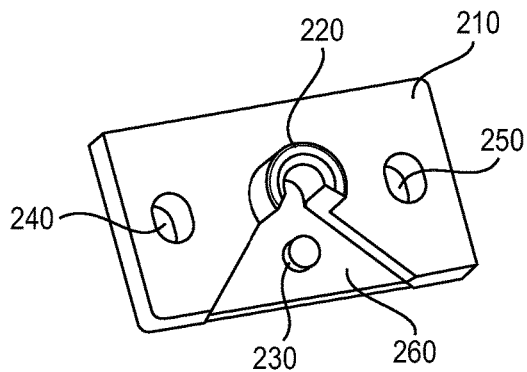
FIG. 4  FIG. 5

DIVERTERS AND COOKING CHAMBERS AND COOKING APPARATUS INCLUDING DIVERTERS

CROSS REFERENCE TO RELATED APPLICATIONS

The present application claims priority to U.S. Provisional Application No. 61/645,512, filed on May 10, 2012, the disclosure if which is incorporated by reference in its entirety.

BACKGROUND OF THE INVENTION

1. Field of the Invention

The invention relates generally to diverters for dispersing cooking media in wash systems of cooking apparatus, and cooking chambers and cooking apparatus including such diverters.

2. Description of Related Art

When preparing food in fryer apparatus that use cooking media, including an open fryer and a pressure fryer, the quality of the cooking medium, e.g., an oil, a liquid shortening, a meltable-solid shortening, and a semi-solid shortening, may impact the quality of the food products, e.g., poultry, fish, and potato products, that are cooked. Known fryer apparatus may include one or more cooking chambers, e.g., fryer pots or vats, which may be filled with a cooking medium.

As the cooking medium is used to cook food, particles of food may contaminate the cooking medium. The flavor characteristics of each of these food particles may become infused in the cooking medium. This infusion may affect food quality adversely. Moreover, upon heating the cooking medium, the cooking medium may undergo chemical reactions, e.g., hydrolysis, oxidation, or polymerization, or combinations thereof. These chemical reactions may result in compounds, such as free fatty acids, hydroperoxides, or polymerized triglycerides, or combinations thereof. In addition, such reactions may reduce the viscosity of the cooking medium, which also may adversely affect cooking performance. In some instances, such changes to the cooking medium do not become apparent until significant change has occurred.

These chemical reactions and flavor infusions may shorten the useful life of the cooking medium, and may result in more frequent replacement of cooking medium. Moreover, as operators of fryer apparatus transition to using specialized cooking media, i.e., zero trans fat cooking media, replacement of an entire batch of cooking medium may be expensive and time consuming. Thus, known fryer apparatus include wash systems that use filtering mechanisms to remove particles, such as foreign objects, clumps, cracklings, and crumbs from the cooking medium, in order to extend the useful life of the cooking medium. Nevertheless, in known fryer apparatus, these undesirable foreign particles, e.g., crumbs, clumps of cooking debris, or cracklings, or combinations thereof, may remain in the system and accumulate at the bottom and sides of the cooking chamber.

SUMMARY OF THE INVENTION

Therefore, a need has arisen for diverters for dispersing cooking media in wash systems of cooking apparatus, and cooking chambers and cooking apparatus including such diverters, that overcome these and other shortcomings of the related art.

In an embodiment of the invention, a diverter comprises a diverter plate; an orifice that projects from a surface of the diverter plate, the orifice comprising an open sidewall portion; a recessed portion formed in the diverter plate, extending from the orifice; and a bumper portion that projects from a surface of the recessed portion and is disposed proximate to the orifice.

In another embodiment of the invention, a cooking chamber configured to hold cooking media therein and to cook food products therein, comprises a heating element configured to convey heat to cooking media held in the cooking chamber; a wall; an inlet port formed in the wall; a cooking chamber fitting disposed adjacent to the inlet port; and a diverter disposed adjacent to the inlet port. The cooking chamber fitting is configured to provide a fluidically sealed coupling to receive cooking media transferred through the inlet port into a vat defined by the wall. The diverter comprises a diverter plate; an orifice that projects from a surface of the diverter plate; a recessed portion formed in the diverter plate, extending from the orifice; and a bumper portion that projects from a surface of the recessed portion and is disposed proximate to the orifice. The orifice comprises an open sidewall portion and is configured to receive the cooking chamber fitting, such that cooking media is allowed to pass therethrough.

In still another embodiment of the invention, a cooking apparatus comprises a cooking chamber configured to hold cooking media therein and to cook food products therein; a filter pan disposed in fluid communication with the cooking chamber and configured to receive and filter cooking media from the cooking chamber via a drain in the cooking chamber; a filter pump configured to pump filtered cooking media from the filter pan to the cooking chamber; an inlet port formed in a wall of the cooking chamber through which filtered cooking media enter the cooking chamber; and a diverter disposed adjacent to the inlet port. The diverter comprises a bumper portion that projects from a surface of the diverter.

Other objects, features, and advantages of the present invention are apparent to persons of ordinary skill in the art in view of the following detailed description of the invention and the accompanying drawings.

BRIEF DESCRIPTION OF THE DRAWINGS

For a more complete understanding of the embodiments of the present invention, needs satisfied thereby, and the objects, features, and advantages thereof, reference now is made to the following description taken in connection with the accompanying drawings.

FIG. 2 is a front view of a diverter, according to an embodiment of the invention.

FIG. 3 is a rear view of a diverter, according to an embodiment of the invention.

FIG. 4 is a cross-sectional view of the diverter depicted in FIG. 3, taken along line A-A.

FIG. 5 is a front perspective view of a diverter, according to an embodiment of the invention.

DETAILED DESCRIPTION OF EMBODIMENTS OF THE INVENTION

Embodiments of the present invention, and their features and advantages, may be understood by referring to FIGS. 1-17, like numerals being used for corresponding parts in the various drawings.

Figure 1:
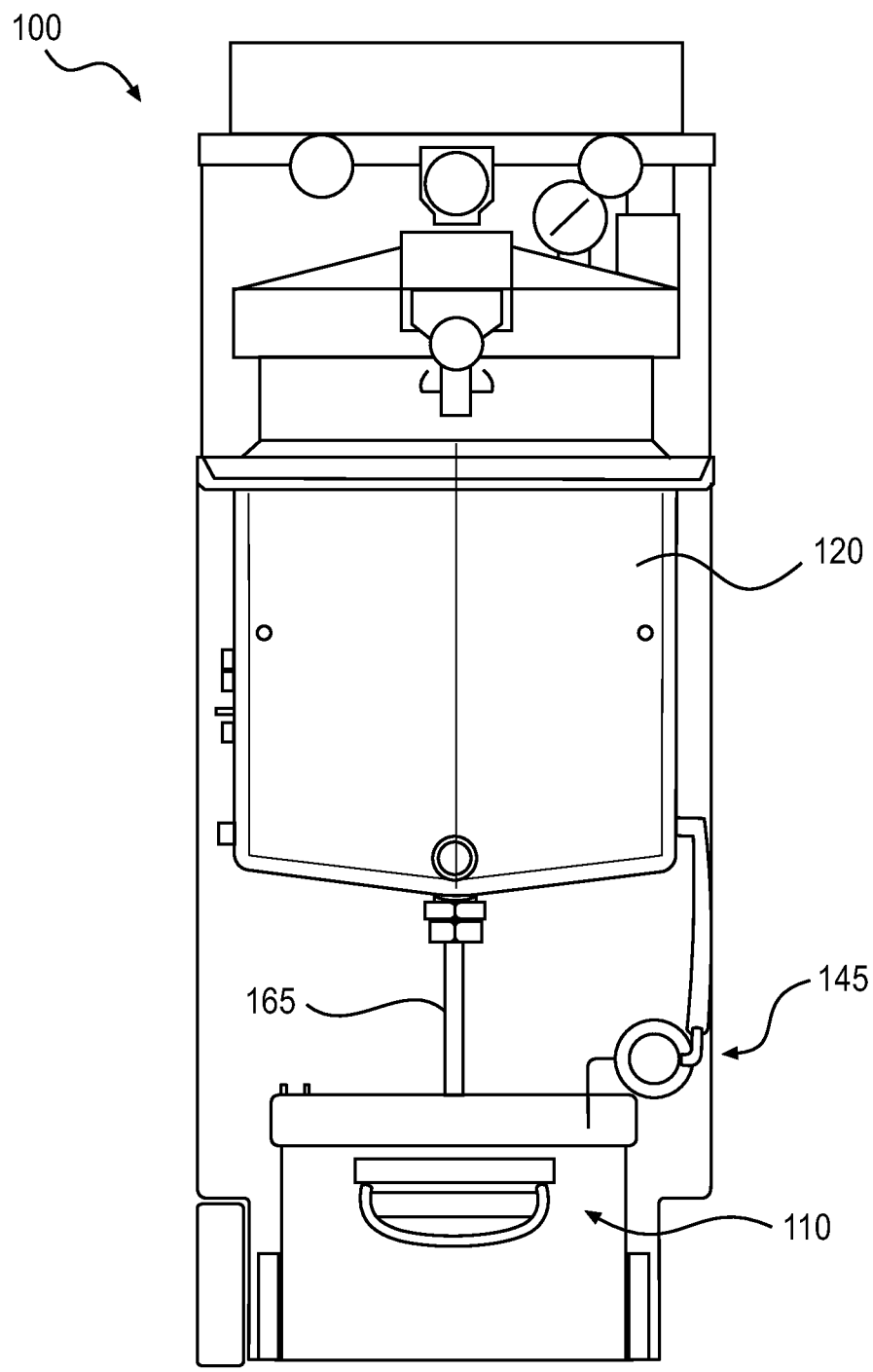
FIG. 1 is a front view of a fryer apparatus, according to an embodiment of the invention.

FIG. 1 depicts a cooking apparatus, according to an embodiment of the invention. Cooking apparatus 100 may comprise at least one cooking chamber 120, which may be configured to hold a cooking medium, e.g., an oil, a liquid shortening, a meltable-solid shortening, a semi-solid shortening, or the like. Cooking apparatus 100 also may comprise a filter pan 110 configured to hold and filter cooking media. Further, cooking apparatus 100 may comprise a connecting tube 165 that creates a pathway for cooking media to be drained from cooking chamber 120, through a drain in cooking chamber 120, to filter pan 110 to be filtered. Cooking apparatus 100 may include an opening whereby filter pan 110 may be inserted into and removed from a cavity below cooking chamber 120. In addition, cooking apparatus 100 may comprise a return pump 145. When activated, return pump 145 may facilitate movement of the cooking medium through a filter element in filter pan 110, and return filtered cooking medium to cooking chamber 120 via a return tube 155 and inlet port. Although the cooking apparatus depicted in FIG. 1 is a pressure fryer having a lid, the apparatus, systems, and methods described herein also may be used with open-well fryers, and the like. A pressure fryer is depicted here merely for exemplary purposes.

FIG. 2 depicts a front view of a diverter 200, according to an embodiment of the invention. Diverter 200 may include a diverter plate 210 and an orifice fitting 220 disposed on diverter plate 210. Orifice fitting 220 may be a cylindrically-shaped segment having a substantially semi-circular cross-section and having an opening formed in a sidewall thereof, i.e., an open sidewall portion. In alternative embodiments, the relative dimensions of the open sidewall portion may be greater or less than the portion depicted in FIG. 2. A bumper portion 230 may be disposed proximate to orifice fitting 220 within a recessed portion 260 formed in diverter plate 210, such that bumper portion 230 protrudes from a surface of recessed portion 260. A cross-section of bumper portion 230 may be substantially circular. In alternative embodiments, a cross-section of bumper portion 230 may be substantially semi-circular, triangular, elliptical, square, crescent-shaped, curved segment, or other geometric shape.

As depicted in FIGS. 2 and 3, diverter 200 also may include openings 240 and 250 formed through the diverter plate for securing diverter 200 to an object or surface. For example, diverter 200 may be mounted to a sidewall of cooking chamber 120, disposed at a predetermined distance from a bottom wall of cooking chamber 120. Diverter 200 may be secured to an object or surface using conventional attachment means, such as screws, nails, bolts, adhesives, ties, welding, or the like, or combinations thereof. Orifice coupling 220 may be disposed at the geometric center of diverter plate 210 or may be offset from the geometric center of diverter plate 210 by a predetermined distance. Further, the center of bumper portion 230 may be aligned with the center of orifice fitting 220 or may be offset from the center of orifice fitting 220 by a predetermined distance. Although bumper portion 230 is depicted as being disposed a particular predetermined distance away from orifice fitting 220, the predetermined distance between bumper portion 230 and orifice fitting 220 also may be greater than or less than the particular predetermined distance depicted in FIG. 2.

FIG. 4 depicts a cross-sectional view of diverter 200, taken along line A-A of FIG. 3. As depicted in FIG. 4, orifice fitting 220 may project from a surface of diverter plate 210. Further, bumper portion 230 may project from a surface of recessed portion 260. The distance that bumper portion 230 projects from a surface of recessed portion 260 (i.e., the height of bumper portion 230) may be substantially equal to the depth of recess portion 260 formed in diverter plate 210. In alternative embodiments, the height of bumper portion 230 may be greater than or less than the depth of recess portion 260. Further, the height of bumper portion 230 may be less than the distance that orifice fitting 220 projects from a surface of diverter plate 210 (i.e., the height of orifice fitting 220). In alternative embodiments, the height of bumper portion 220 may be greater than or equal to the height of orifice fitting 220.

FIG. 5 depicts a perspective view of diverter 200, according to an embodiment of the invention. Orifice fitting 220 may have an open sidewall portion that opens toward bumper portion 230. The sides of recessed portion 260 may extend from the open sidewall portion of orifice fitting 220 to an edge of diverter plate 210. Further, the sides of recessed portion 260 may be angled, such that a distance between the sides may increase as a distance from orifice fitting 220 increases. The end portions of the cylindrically-shaped segment comprising orifice fitting 220 may coincide substantially with the sides of recessed portion 260, such that the end portions of the cylindrically-shaped segment are angled in accordance with the angle of the sides of recessed portion 260.

Figure 6:
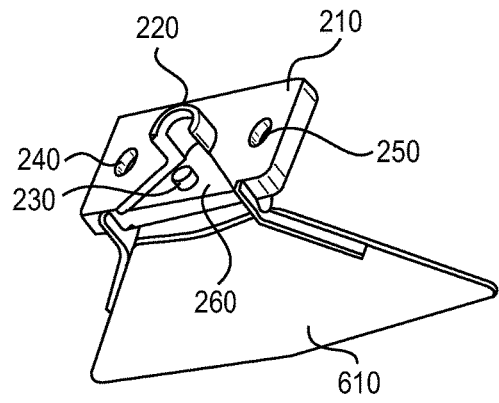
FIG. 6 is front perspective view of a diverter, according to an embodiment of the invention.

FIG. 6 depicts a front perspective view of diverter 200, according to an embodiment of the invention. As depicted in FIG. 6, orifice fitting 220 may extend from a surface of diverter plate 210, and bumper portion 230 may extend from a surface of recessed portion 260 formed in diverter plate 210. Further, a splash receiving member 610 may be coupled to diverter plate 210. Splash receiving member 610 may serve as a splash diverter, a splash director, or a splash guard. Splash receiving member 610 also may receive spray or mist and may serve to divert or direct the spray or mist within cooking chamber 120. Splash receiving member 610 may function as a splash diverter, a splash director, or a splash guard when cooking media enters cooking chamber 120 through orifice fitting 220, which may be coupled to a cooking chamber fitting or pot fitting, depicted in FIG. 16, disposed at inlet port 1610 of cooking chamber 120.

Figure 7:
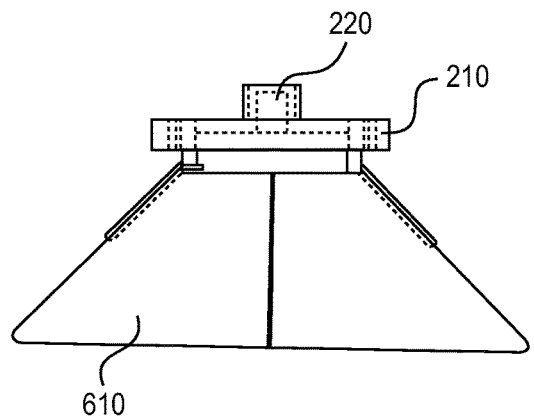
FIG. 7 is a side view of a diverter, according to an embodiment of the invention.

FIG. 7 depicts a side view of diverter 200, according to an embodiment of the invention. As depicted in FIG. 7, splash receiving member 610 may extend outward from diverter 200. Further, the sides of splash receiving member 610 may be angled, such that a distance between the sides may increase as a distance from diverter 200 increases.

Figure 8:
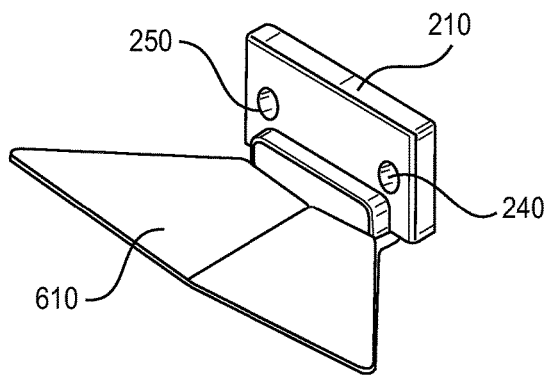
FIG. 8 is a rear perspective view of a diverter, according to an embodiment of the invention.

FIG. 8 depicts a rear perspective view of diverter 200, according to an embodiment of the invention. As depicted in FIG. 8, splash receiving member 610 may extend outward from the rear of diverter 200, away from the front side of diverter 200. Further, splash receiving member 610 may be secured to diverter 200 via clips, a connecting member, or other suitable connecting means, such as screws, nails, bolts, adhesives, ties, welding, or the like, or combinations thereof.

Figure 9:
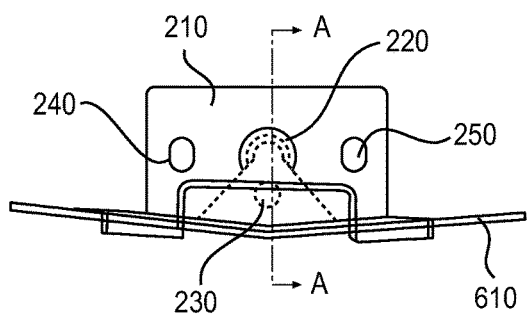
FIG. 9 is a front view of a diverter, according to an embodiment of the invention.
Figure 15:
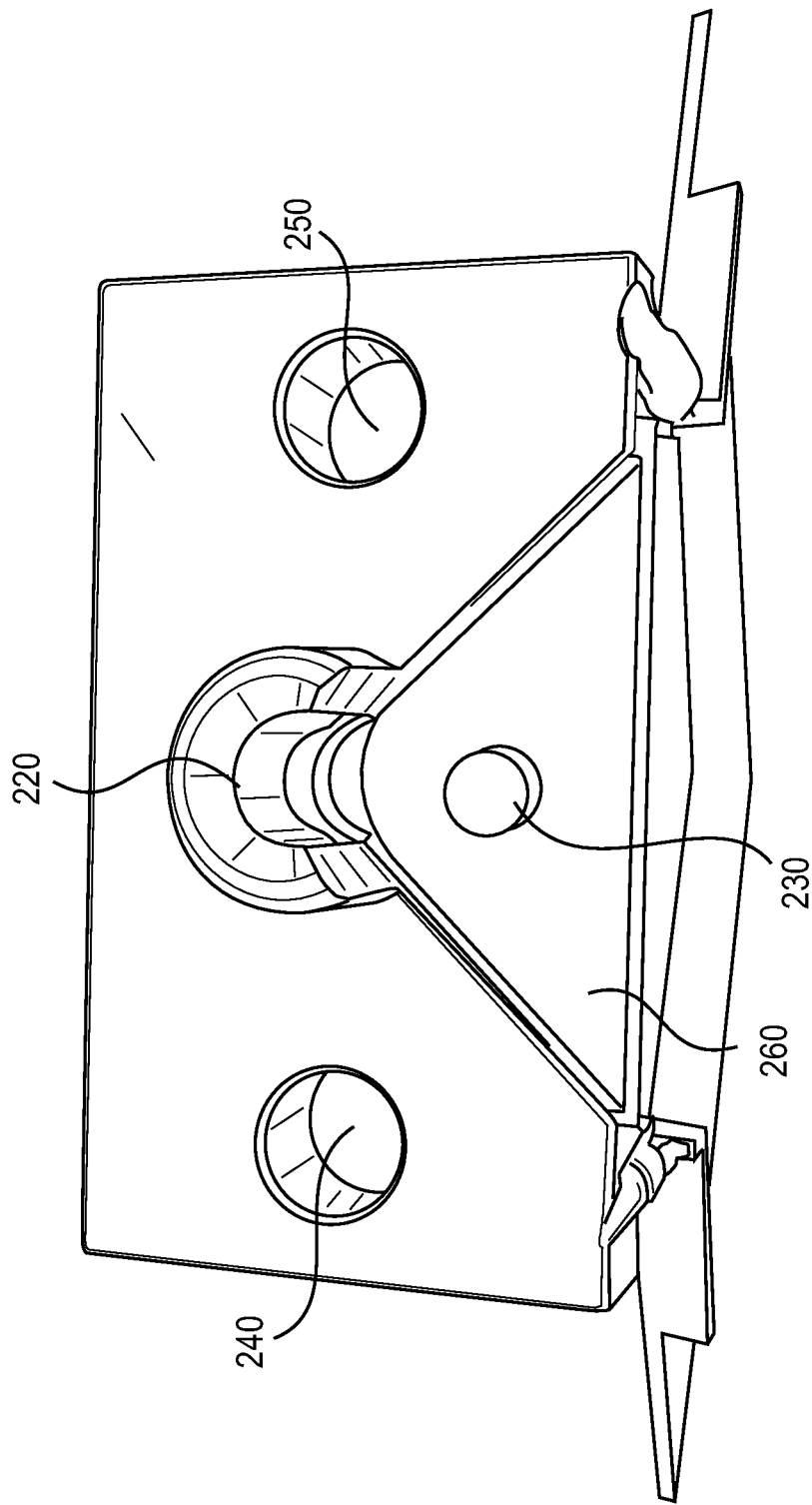
FIG. 15 is a front view of a diverter, according to an embodiment of the invention.

FIG. 9 depicts a front view of diverter 200, according to an embodiment of the invention. As depicted in FIG. 9, the portion of splash receiving member 610 having the greatest width may have a width greater than the width of diverter 200. Further, splash receiving member 610 may be flat or may have angled portions. The angled portions may converge to a longitudinal center of diverter 200. In addition, orifice fitting 220 may be disposed at the geometric center of diverter plate 210 or may be offset from the geometric center of diverter plate 210 by a predetermined distance. Further, the center of bumper portion 230 may be aligned with the center of orifice fitting 220 or may be offset from the center of orifice fitting 220 by a predetermined distance. FIG. 15 depicts a front view of diverter 200, according to an embodiment of the invention, similar to FIG. 9.

Figure 10:
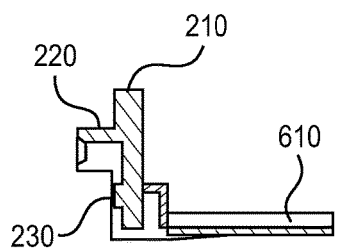
FIG. 10 is a cross-sectional view of the diverter depicted in FIG. 9, taken along line A-A.

FIG. 10 depicts a cross-sectional view of diverter 200, taken along line A-A of FIG. 9. As depicted in FIG. 10, splash receiving member 610 may extend a predetermined distance from the rear of diverter plate 210. Further, a portion of splash receiving member 610 may extend below the bottom of diverter plate 210. In alternative embodiments, no portion of splash receiving member 610 may extend below the bottom of diverter plate 210. FIG. 10 also depicts that the orifice (defined by orifice fitting 220) and the bumper portion 230 are formed integrally as a unitary piece with the diverter 200 and diverter plate 210 in this embodiment.

Figure 11:
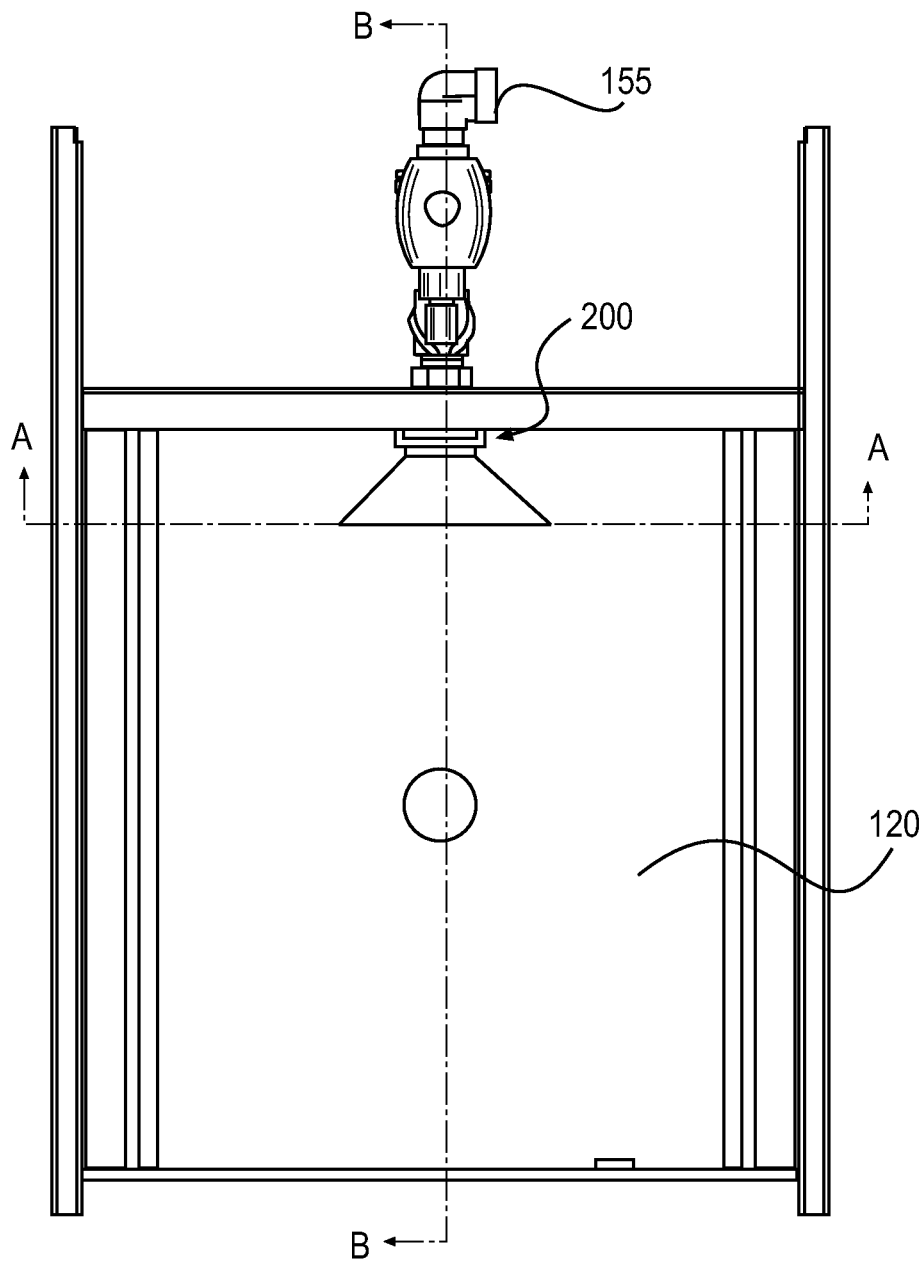
FIG. 11 is a top view of a cooking chamber, according to an embodiment of the invention.
Figure 12:
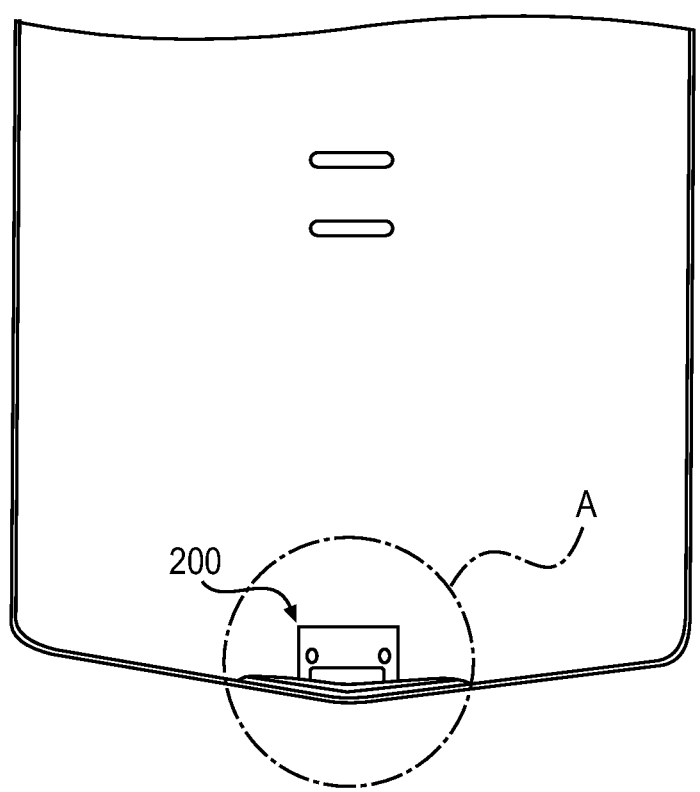
FIG. 12 is a cross-sectional view of the cooking chamber depicted in FIG. 11, taken along line A-A.
Figure 17:
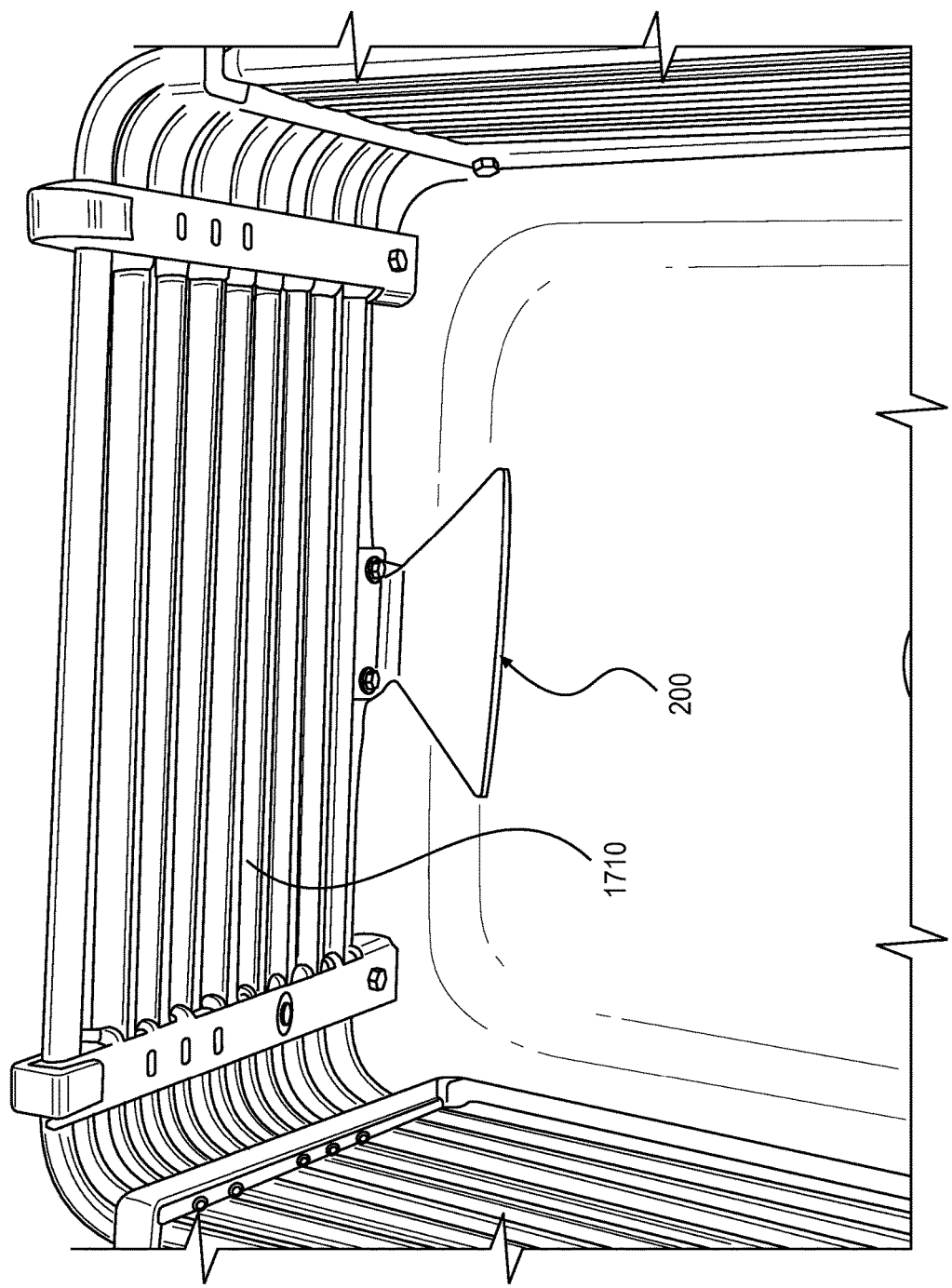
FIG. 17 is a top view of a cooking chamber and diverter, according to an embodiment of the invention.

FIG. 11 depicts a top view of cooking chamber 120, according to an embodiment of the invention. As depicted in FIG. 11, return tube 155 may be disposed adjacent to an inlet port formed in the wall of cooking chamber 120. Cooking media may be transferred therethrough, into cooking chamber 120 via diverter 200. Cooking chamber 120 may include a heating element 1710, depicted in FIG. 17, configured to convey heat to cooking media held in the cooking chamber. FIG. 12 depicts a cross-sectional view of cooking chamber 120, taken along line A-A of FIG. 11. As depicted in FIG. 12, diverter 200 may be secured to a wall of cooking chamber 120. FIG. 17 depicts a top perspective view of cooking chamber 120, including heating element 1710 and diverter 200, according to an embodiment of the invention.

Figure 13:
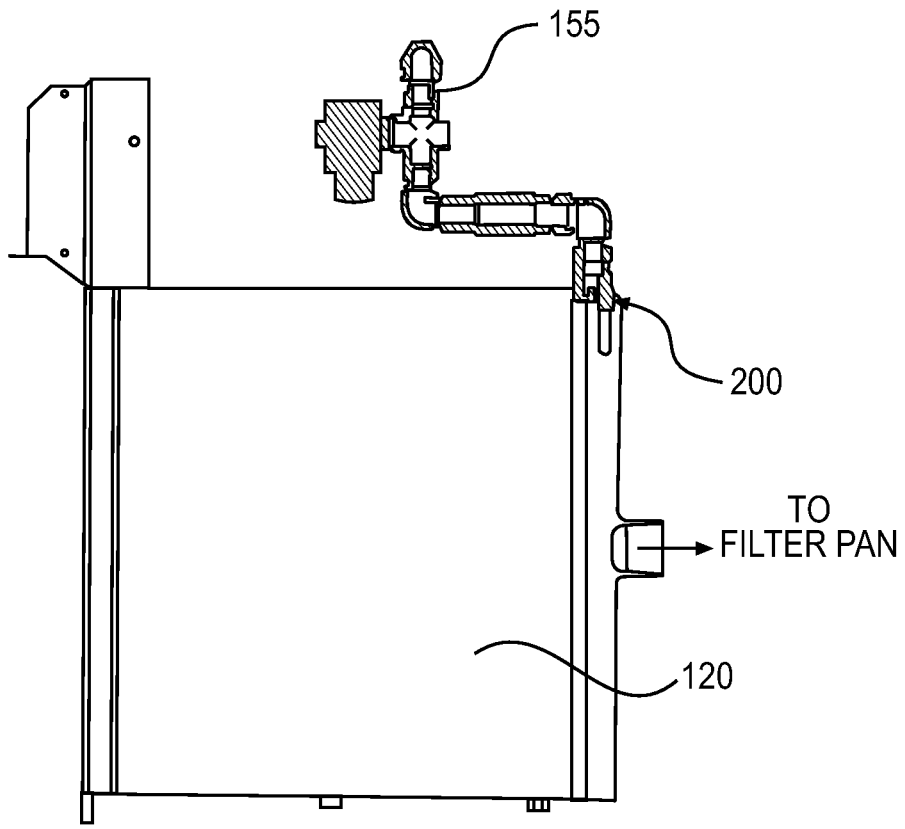
FIG. 13 is a cross-sectional view of the cooking chamber depicted in FIG. 11, taken along line B-B.
Figure 16:
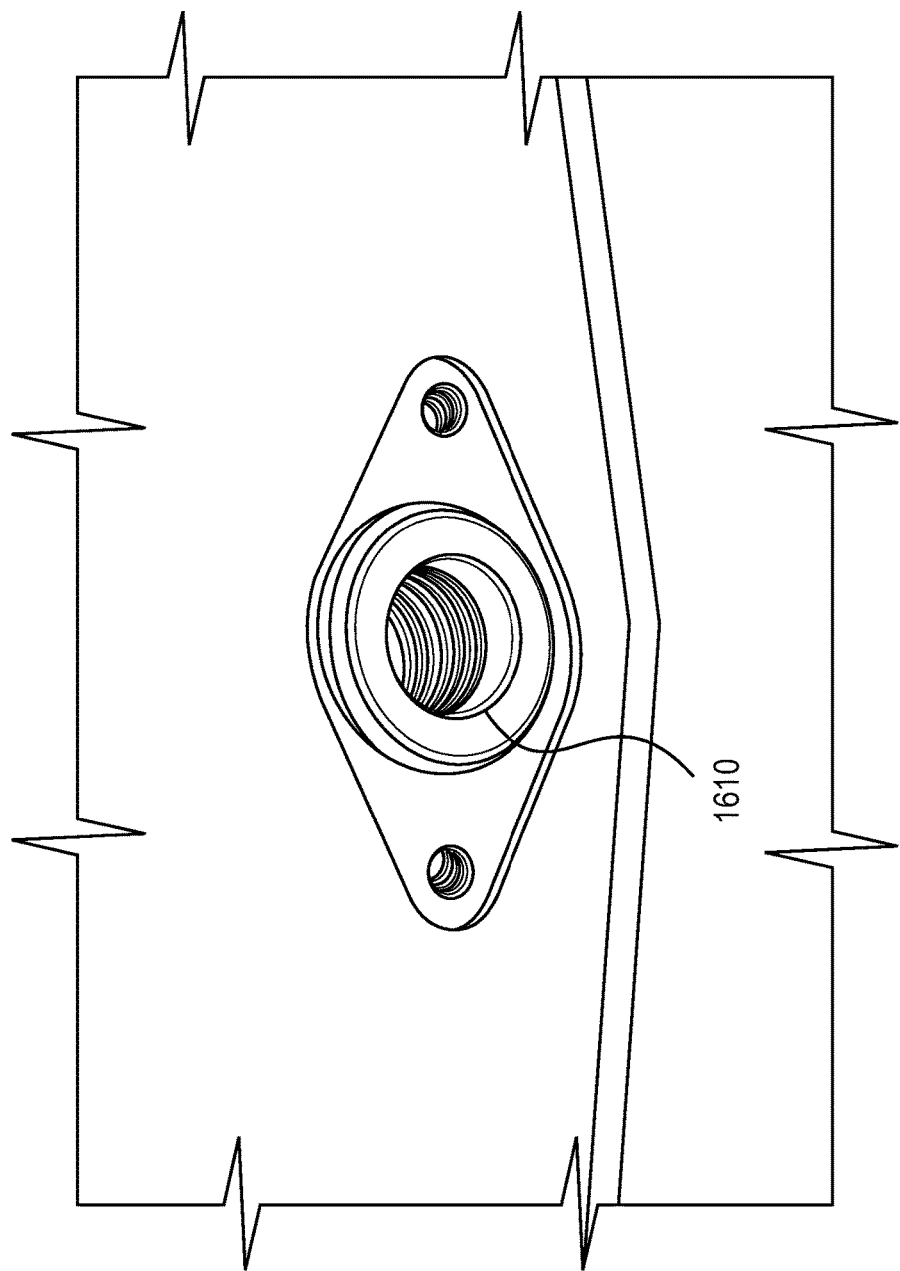
FIG. 16 is a front view of a cooking chamber fitting and inlet port formed in a wall of a cooking chamber, according to an embodiment of the invention.

FIG. 13 depicts a cross-sectional view of cooking chamber 120, taken along line B-B of FIG. 11. As depicted in FIG. 13, return pipe 155 may be fluidically coupled to cooking chamber 120, via a cooking chamber fitting, depicted in FIG. 16, and orifice fitting 220, to transfer cooking media to cooking chamber 120 via inlet port 1610 formed in the wall of cooking chamber 120. Orifice fitting 220 may be configured to receive a fitting of cooking chamber 120, to which diverter 200 may be mounted, to provide the fluidically sealed coupling to receive cooking media transferred to cooking chamber 120. Return pump 145 may transfer cooking media from filter pan 110 to cooking chamber 120. FIG. 16 depicts a front perspective view of a cooking chamber fitting and inlet port 1610 formed in a wall of cooking chamber 120, according to an embodiment of the invention.

Figure 14:
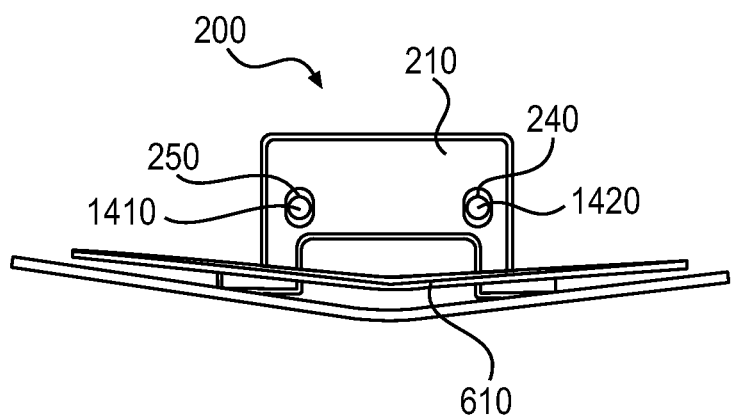
FIG. 14 is a detail view of a portion of the cross-sectional view of the cooking chamber taken along line A-A, depicted in FIG. 12.

FIG. 14 depicts a detail view of a portion of the cross-sectional view depicted in FIG. 12, taken along line A-A of FIG. 11. As depicted in FIG. 14, attachment means 1410 and 1420 may be inserted through openings 240 and 250 to secure diverter 200 to the wall of cooking chamber 120. Although FIG. 14 depicts two bolts as an example of attachment means 1410 and 1420, the attachment means also may include screws, adhesives, ties, clips, welding, or the like, or combinations thereof.

In operation, a control of the cooking apparatus may initiate filtering and a drain valve in cooking chamber 120 may be opened, causing cooking media in cooking chamber 120 to flow through the drain of cooking chamber 120 and into filter pan 110. During the filtering process, the control may initiate pumping, by return pump 145, of filtered cooking media from filter pan 110 to an inlet port formed through a wall of cooking chamber 120. As the filtered cooking media enters the cooking chamber, diverter 200 may diffuse cooking media and may effectively wash sediment and debris (e.g., foreign particles, crumbs, clumps, cracklings, and the like) from the sides or bottom, or both, of cooking chamber 120. Bumper portion 230 on diverter 200 may create an increased velocity of the cooking media to wash or flush particles in cooking chamber 120 toward the drain. Bumper portion 230 may increase the width of the area covered by the cooking media entering cooking chamber 120 and may increase the velocity of the flow of cooking media entering cooking chamber 120 that washes or flushes particles toward the drain. Thus, bumper portion 230 may allow cooking media to reach a greater area on the bottom surface of cooking chamber 120.

The filtering described above may include a variety of filtering processes. For example, the filtering may include an accelerated filtering or a maintenance filtering, or a combination thereof.

A frequent filtration may be one of multiple filterings of cooking media performed periodically during a day, or other period of time, to remove particles, such as crumbs, silt, clumps, cracklings, cooking medium deterioration compounds, and the like. For example, the frequent filtration may comprise draining cooking media from the cooking chamber to a filter pan, circulating cooking media through filter media, and pumping cooking media from the filter pan back into the cooking chamber. The frequent filtration also may include, for example, skimming crumbs, silt, clumps, cracklings, cooking medium deterioration compounds, or the like, from the cooking medium.

A maintenance filtering may be performed daily, or periodically at other time intervals (e.g., intervals of greater than one day or less than one day) to clean the cooking chamber, filter pan, or other components of a cooking apparatus. For example, the maintenance filtering may include a more thorough cleaning of the cooking chamber, which may include scraping accretion of particles from the cooking chamber walls, brushing particles from cooking chamber crevices and cavities, and soaking the cooking chamber with a cleaning solution (e.g., a detergent, a slightly high pH cleaning solution, or the like). The particles may include, for example, crumbs, silt, clumps, cracklings, cooking medium deterioration compounds, and the like.

While the invention has been described in connection with preferred embodiments, it will be understood by those of ordinary skill in the art that other variations and modifications of the preferred embodiments described above may be made without departing from the scope of the invention. Other embodiments will be apparent to those of ordinary skill in the art from a consideration of the specification or practice of the invention disclosed herein. The specification and the described examples are considered as exemplary only, with the true scope and spirit of the invention indicated by the following claims.

What is claimed is:

1. A cooking chamber configured to hold cooking media therein and to cook food products therein, comprising:
    a heating element configured to convey heat to cooking media held in the cooking chamber;
    a wall;
    an inlet port formed in the wall;
    a cooking chamber fitting disposed adjacent to the inlet port, the cooking chamber fitting configured to provide a fluidically sealed coupling to receive cooking media transferred through the inlet port into a vat defined by the wall; and
    a diverter disposed adjacent to the inlet port, wherein the diverter comprises:
        a diverter plate;
        a recessed portion formed in the diverter plate,
        an orifice that projects in a first direction from a surface of the recessed portion formed in the diverter plate, the orifice comprising an open sidewall portion and configured to receive the cooking chamber fitting, such that the cooking media is allowed to pass therethrough;
        wherein the recessed portion extends from the orifice;
        a bumper portion that projects in the first direction from the surface of the recessed portion and is disposed proximate to the orifice;
        the open sidewall portion of the orifice configured to open towards the bumper portion; and
        wherein the recessed portion faces the inlet port.

2. The cooking chamber of claim 1, wherein the bumper portion is configured to cause the cooking media transferred through the inlet port to be dispersed at an increased velocity around the bumper portion, wherein particles within the cooking chamber are flushed toward a drain in the cooking chamber.

3. The cooking chamber of claim 1, wherein a height of the bumper portion is substantially equal to a depth of the recessed portion.

4. The cooking chamber of claim 1, wherein the orifice comprises a cylindrically shaped segment having a substantially semi-circular cross-section.

5. The cooking chamber of claim 1, wherein sides of the recessed portion are angled, such that a distance between the sides increases as a distance from the orifice increases.

6. The cooking chamber of claim 1, wherein sides of the recessed portion extend from the open sidewall portion of the orifice to an edge of the diverter plate.

7. The cooking chamber of claim 1, wherein a cross-section of the bumper portion is substantially circular.

8. A cooking apparatus, comprising:
    the cooking chamber of claim 1;
    a filter pan disposed in fluid communication with the cooking chamber and configured to receive and filter cooking media from the cooking chamber via a drain in the cooking chamber; and
    a filter pump configured to pump filtered cooking media from the filter pan to the cooking chamber.

9. The cooking apparatus of claim 8, wherein the diverter is configured to disperse the cooking media, such that particles within the cooking chamber are flushed toward the drain of the cooking chamber, and wherein the bumper portion is configured to cause the cooking media entering the cooking chamber to be dispersed at an increased velocity around the bumper portion.

10. The cooking apparatus of claim 8, wherein sides of the recessed portion are angled, such that a distance between the sides increases as a distance from the orifice increases.

11. The cooking apparatus of claim 8, wherein a height of the bumper portion is substantially equal to a depth of the recessed portion.

12. The cooking apparatus of claim 8, wherein the orifice comprises a cylindrically shaped segment having a substantially semi-circular cross-section, and wherein the open sidewall portion of the orifice is configured to open towards the bumper portion.

13. The cooking chamber of claim 1, wherein the orifice is integrally formed as a unitary piece with the diverter plate.

14. The cooking chamber of claim 1, wherein the bumper portion is integrally formed as a unitary piece with the diverter plate.

15. The cooking apparatus of claim 8, wherein the orifice is integrally formed as a unitary piece with the diverter.

16. The cooking apparatus of claim 8, wherein the bumper portion is integrally formed as a unitary piece with the diverter.

* * * * *